US006986268B2

United States Patent
Lee

(10) Patent No.: US 6,986,268 B2
(45) Date of Patent: Jan. 17, 2006

(54) METHOD FOR THE PREPARATION OF PLATE GLASS HAVING LOW RESIDUAL STRESS

(75) Inventor: Sang-Hwa Lee, Gumi-si (KR)

(73) Assignee: Samsung Corning Precision Glass Co., Ltd., (KR)

( * ) Notice: Subject to any disclaimer, the term of this patent is extended or adjusted under 35 U.S.C. 154(b) by 476 days.

(21) Appl. No.: 10/286,716

(22) Filed: Nov. 1, 2002

(65) Prior Publication Data

US 2004/0055335 A1 Mar. 25, 2004

(30) Foreign Application Priority Data

Sep. 25, 2002 (KR) ............. 10-2002-0058020

(51) Int. Cl.
  *C03B 27/00* (2006.01)
(52) U.S. Cl. ............... 65/95; 65/104; 65/114; 65/115; 65/117
(58) Field of Classification Search .......... 65/95, 65/114, 17.1, 33.1, 102, 117–119, 104, 115
  See application file for complete search history.

(56) References Cited

U.S. PATENT DOCUMENTS

| | | | | |
|---|---|---|---|---|
| 3,251,671 A | * | 5/1966 | Gardon | 65/118 |
| 3,914,118 A | * | 10/1975 | Brooke et al. | 65/95 |
| 4,172,921 A | * | 10/1979 | Kiefer | 428/410 |
| 4,198,463 A | * | 4/1980 | Greenhalgh | 428/332 |
| 4,445,921 A | * | 5/1984 | Bennett et al. | 65/114 |
| 5,127,932 A | * | 7/1992 | Aratani | 65/114 |
| 5,676,722 A | * | 10/1997 | Seidel et al. | 65/111 |
| 5,679,124 A | * | 10/1997 | Schnabel, Jr. et al. | 65/348 |
| 6,751,988 B2 | * | 6/2004 | Hirotsu et al. | 65/25.4 |

FOREIGN PATENT DOCUMENTS

| | | | |
|---|---|---|---|
| EP | 832858 A2 | * | 4/1998 |
| JP | 05306133 A | * | 11/1993 |
| JP | 2000086261 A | * | 3/2000 |
| JP | 2001322823 A | * | 11/2001 |

* cited by examiner

Primary Examiner—Dionne A. Walls
Assistant Examiner—Carlos Lopez
(74) Attorney, Agent, or Firm—Anderson Kill & Olick, P.C.

(57) ABSTRACT

A flat glass plate having a low residual stress, suitable for use in preparing a display, can be prepared without an annealing or polishing process by way of controlling the horizontal temperature gradient of a molten glass plate to a specific range during cooling.

8 Claims, 1 Drawing Sheet

METHOD FOR THE PREPARATION OF PLATE GLASS HAVING LOW RESIDUAL STRESS

FIELD OF THE INVENTION

The present invention relates to a method for preparing a flat glass plate having low residual stress, suitable for use in a display, which does not require an annealing or polishing step but comprises controlling the horizontal temperature gradient of a molten glass plate to a specific range during cooling.

BACKGROUND OF THE INVENTION

A plate glass manufactured by cooling a molten glass plate according to a conventional process carries residual internal stress which causes distortion when the plate is cut into a desired size. Such a cut plate when used as a display glass panel exhibits poor picture display characteristics.

Accordingly, in order to eliminate the internal stress remaining in a plate glass, Japanese Publication Patent Nos. 1993-306133, 2000-86261 and 2001-322823, and European Publication Patent No. 832,858 disclose a method of subjecting a cut glass plate to annealing post-treatment. However, such an annealing process has problems in that it requires a prolonged processing time and the annealed glass surface needs polishing to correct the surface deformation brought about by the annealing process.

The internal stress remaining in a glass plate after cooling a molten form thereof arises from the viscoelastic properties of glass, and when the theory and experimental information developed by Narayanaswami et al. are applied to the plate glass cooling process, only the residual stress across the thickness thereof can be assessed. However, such distortion of a plate glass occurs mainly along the horizontal width direction of the plate because of the significant temperature difference between the ends and center of the plate during cooling.

Accordingly, the present inventor has endeavored to develop a method for reducing such residual stress formed along the horizontal width direction of the plate and has found that a flat glass plate having a low residual stress can be prepared by adjusting the horizontal temperature gradient of a molten glass plate to a specific range during cooling.

SUMMARY OF THE INVENTION

Accordingly, it is an object of the present invention to provide a method for preparing a flat glass plate having a low residual stress, which does not require an annealing or polishing process.

In accordance with one aspect of the present invention, there is provided a method for preparing a plate glass by cooling a molten glass plate having a width of L cm, comprising: 1) gradually increasing the temperature gradient between a maximum temperature point set at the center part and a minimum temperature point set at 0.005 L cm away from the end part toward the center on a horizontal line across the width of the plate glass from 0 to 0.10° C./mm while the glass is in a fluid state, 2) gradually decreasing said temperature gradient from 0.10 to 0.03° C./mm while the glass changes from a fluid state into a glassy state, 3) gradually increasing said temperature gradient from 0.03 to 0.10° C./mm until the transition into a glassy state is completed, and 4) gradually decreasing said temperature gradient while the glass is in a glassy state, wherein the difference between the final temperature gradient values of steps 2) and 3) is adjusted within the range of 0.01 to 0.04° C./mm.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

Figure 1:
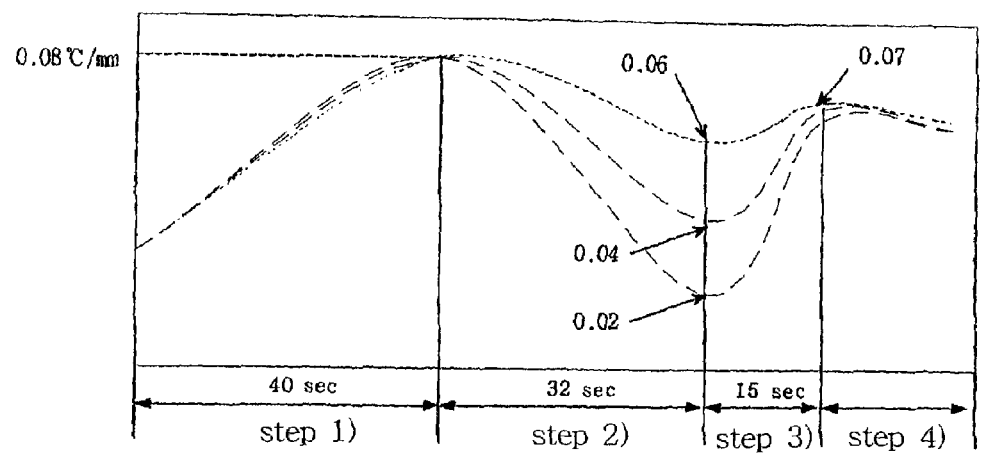
FIG. 1: the temperature gradient profiles observed in Examples 1 and 2, and Comparative Example.

Generally, a plate glass for a display may be prepared by cooling and solidifying a longitudinally progressing molten glass plate exiting a mold, i.e., by four steps of: 1) starting cooling a molten glass plate (fluid state), 2) controlling both end parts of the plate (fluid-to-glassy state transition region I), 3) fixing the end parts and relaxing stress (fluid-to-glassy state transition region II), and 4) fixing the stress and completing the glass formation (glassy state).

Also, in order to prevent cooling shrinkage of the plate, the thickness of each end is controlled at a thickness thicker than the desired plate thickness. Therefore, the term "end part" used herein refers to such a thick end region which is formed at a peripheral region of the width margin. For example, the end part may be 3 to 4 fold thicker than the plate thickness and 0.5 to 2.0 cm wide.

The method of the present invention is characterized by controlling the horizontal temperature gradient across the plate to specific ranges in steps 2) and 3) which most critically influence the residual internal stress of a formed glass plate.

Each of the specific steps for preparing a plate glass for use in preparing a display in accordance with the present invention is as follows, wherein "softening point" is referred to as the temperature at which a cylinderic glass sample with a diameter of 0.65 mm and a length of 23.5 cm extends at a rate of 1 mm/min due to its own weight when heated at a rate of 5° C./min in an electric furnace (ASTM C338-93); "annealing point", the temperature at which the stress formed in glass is reduced to below 250 psi within 15 minutes or the viscosity of glass becomes $10^{13}$ poise (ASTM C336-71); and "strain point", the temperature at which the stress formed in glass is reduced to below 250 psi within 4 hours or the viscosity of glass becomes $10^{14.5}$ poise (ASTM C336-71).

In step 1), as a molten glass plate having a width of L cm exiting a mold starts to cool, the temperature gradient between a maximum temperature point set at the center part of the plate and a minimum temperature point set at 0.005 L cm away from the end part toward the center on a horizontal line across the width of the plate glass is gradually increased in the range of 0 to 0.10° C./mm while the glass is still in a fluid state. In step 1), as the stress that could arise from the temperature gradient is quickly released, e.g., within 0.00001 second, it is unnecessary to manipulate the temperature gradient for the purpose of reducing the residual stress, but the above-mentioned temperature gradient adjustment performed in step 1) is necessary to set the initial horizontal temperature gradient of subsequent step 2) within the required range.

In step 2), stress starts to form due to the stress relaxation action between the end and other parts, and this stress gradually decreases as the above-mentioned temperature gradient is decreased in the range of 0.10 to 0.03° C./mm while the glass changes from a fluid state into a glassy state. The glass passes through its softening point in step 1) or 2) and closely approaches the annealing point through step 2).

In accordance with the present invention, the initial temperature of the maximum temperature point in step 2) may be adjusted to 890 to 990° C., and the final temperature thereof, to 710 to 810° C. In addition, when the temperature gradient value is less than 0.03° C./mm, longitudinal distortion in the plate occurs, and when more than 0.10° C./mm, a plate having uneven surface results.

Further, in step 2), since the rapid and ununiform cooling of the end part causes horizontal and longitudinal distortion of the glass, it is desired that the temperature gradient between the end part and the minimum temperature point is controlled in the range of 0.1 to 1.5° C./mm while keeping the cooling rate of the end part in the range of 0.1 to 3° C./sec.

In step 3), as the both end parts are fixed and the stress is relieved, said temperature gradient is gradually increased in the range of 0.03 to 0.10° C./mm while the transition into a glassy state is completed. The glass passes through the annealing point and reaches the strain point. In addition, in accordance with the present invention, the difference between the final temperature gradient values of steps 2) and 3) is preferably adjusted within the range of 0.01 to 0.04° C./mm.

In accordance with the present invention, the initial temperature of the maximum temperature point in step 3) may be adjusted to 710 to 810° C. (corresponding to its final temperature in step 2)), and the final temperature thereof, to 640 to 700° C. In particular, in step 3), it is preferred to keep the temperature gradient uniform within the specified range, since fluctuating temperature gradient, even within the above desired range, leads to increased residual stress.

Finally in step 4), the internal stress is fixed as the glass surface temperature becomes less than 100° C. to obtain a formed glass plate, while said temperature gradient is gradually decreased.

In accordance with the present invention, the width L of the plate glass may be in the range of 100 to 300 cm, preferably 140 to 190 cm. Steps 1), 2), 3) and 4) may be conducted for 40 to 360, 30 to 240, 15 to 90 and 60 to 240 seconds, respectively, depending on the constituents of the glass and the cooling rate.

In order to fulfill the above-described cooling condition of the present invention, a radiation heat source for delaying the cooling rate and a cooler for accelerating the cooling rate using a coolant such as air and water may be installed to finely tune the temperature gradient values.

The plate glass prepared by the inventive method is essentially even for the practical use, exhibiting no distortion even when cut into a desired size, and thus requires no further annealing and polishing processes. As described above, the present invention provides a simple and economical method for preparing a flat glass plate suitable for use in preparing a display such as a thin film transistor liquid crystal display (TFT-LCD), plasma display panel (PDP), and organic and inorganic electroluminescent device.

The following Examples and Comparative Example are given for the purpose of illustration only, and are not intended to limit the scope of the invention.

EXAMPLE 1

Molten nonalkali glass for an LCD (product code 1737 available from Samsung Corning Precision Glass Co., Ltd; softening point: 975° C., annealing point: 721° C., strain point: 667° C.) was introduced to a mold and cooled to prepare a plate glass of 140 cm wide (L) and 0.7 mm thick (margin thickness: 2.4 mm, end part width: 1 cm) as follows.

First, the maximum temperature point on a line across the width of the molten glass plate exiting the mold was set at the center part of the plate. The temperature of the maximum temperature point was lowered to 920° C. over a cooling period of 40 seconds while changing the temperature gradient between the maximum temperature point and a minimum temperature point set at 0.7 cm away from the end part towards the center (1.7 cm away from the width margin) from 0.03° C./mm to 0.08° C./mm (step 1)).

Then, the temperature gradient between the maximum and minimum temperature points was changed from 0.08° C./mm to 0.04° C./mm over a cooling period of 32 seconds until the temperature of the maximum temperature point reached 790° C. (step 2)). In step 2), the temperature gradient between the end part and the minimum temperature point was kept at 1° C./mm, and the cooling rate of the end part, at 2° C./sec.

Then, the temperature gradient between the maximum and minimum temperature points was changed from 0.04° C./mm to 0.07° C./mm over a cooling period of 15 seconds until the temperature of the maximum temperature point reached 650° C. (step 3)), followed by cooling the plate glass at a rate of 3° C./sec for 206 seconds to obtain a finished glass plate (step 4)).

Figure 2:
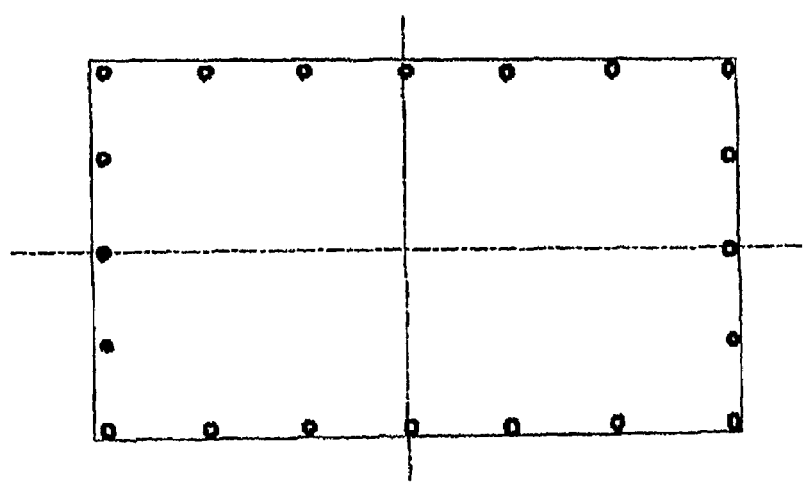
FIG. 2: the residual stress measurement points of a plate glass.

The temperature gradient profile observed over steps 1) to 4) is shown in FIG. 1. The residual stress of the flat part of the plate glass thus obtained was measured at 20 points as shown in FIG. 2 with a photoelasticity gauge (LC-polscope™ available from Cambridge Research Institute Inc., USA). The result showed that the maximum residual stress value was 70 psi and the difference of the maximum and minimum residual stress values was 80 psi. In addition, the surface of the plate glass was satisfactorily even without significant distortion.

EXAMPLE 2

The procedure of Example 1 was repeated except that in step 2), the final temperature gradient value was 0.06° C./mm and the final temperature of the maximum temperature point was 780° C., to prepare a plate glass having the same dimension as in Example 1.

The temperature gradient profile observed over steps 1) to 4) is shown in FIG. 1. The maximum value of the residual stress of the flat part of the plate glass thus obtained was 45 psi and the difference of the maximum and minimum residual stress values was 50 psi. In addition, the surface of the plate glass was satisfactorily even without significant distortion.

Comparative Example

The procedure of Example 1 was repeated except that in step 2), the final temperature gradient value was 0.02° C./mm and the final temperature of the maximum temperature point was 770° C., to prepare a plate glass having the same dimension as in Example 1.

The temperature gradient profile observed over steps 1) to 4) is shown in FIG. 1. The maximum value of the residual stress of the flat part of the plate glass thus obtained was 140 psi and the difference of the maximum and minimum residual stress values was 155 psi. In addition, the surface of the plate glass was bumpy.

As described above, in accordance with the method of the present invention, a flat glass plate having a low residual stress, suitable for use in preparing a display, may be prepared without an annealing or polishing process.

While the invention has been described with respect to the above specific embodiments, it should be recognized that various modifications and changes may be made to the invention by those skilled in the art which also fall within the scope of the invention as defined by the appended claims.

What is claimed is:

1. A method for preparing a plate glass by cooling a molten glass plate having a width of L cm, comprising: 1) gradually increasing the temperature gradient between a maximum temperature point set at the center part and a minimum temperature point set at 0.005 L cm away from the end part toward the center on a horizontal line across the width of the plate glass from 0 to 0.10° C./mm while the glass is in a fluid state, 2) gradually decreasing said temperature gradient from 0.10 to 0.03° C./mm while the glass changes from a fluid state into a glassy state, 3) gradually increasing said temperature gradient from 0.03 to 0.10° C./mm until the transition into a glassy state is completed, and 4) gradually decreasing said temperature gradient while the glass is in a glassy state, wherein the difference between the final temperature gradient values of steps 2) and 3) is adjusted within the range of 0.01 to 0.04° C./mm.

2. The method of claim 1, wherein in step 2), the temperature gradient between the end part and the minimum temperature point is adjusted to 0.1 to 1.5° C./mm, and the cooling rate of the end part is controlled to 0.1 to 3° C./sec.

3. The method of claim 1, wherein L is in the range of 100 to 300 cm.

4. The method of claim 1, wherein the initial temperature of the maximum temperature point of step 2) is in the range of 890 to 990° C.

5. The method of claim 1, wherein the final temperature of the maximum temperature point of step 2) is in the range of 710 to 810° C.

6. The method of claim 1, wherein the final temperature of the maximum temperature point of step 3) is in the range of 640 to 700° C.

7. The method of claim 1, wherein steps 1), 2), 3) and 4) are conducted for 40 to 360, 30 to 240, 15 to 90 and 60 to 240 seconds, respectively.

8. The method of claim 2, wherein L is in the range of 100 to 300 cm.

\* \* \* \* \*